(12) United States Patent
Loehr et al.

(10) Patent No.: US 12,556,317 B2
(45) Date of Patent: Feb. 17, 2026

(54) METHODS AND APPARATUS FOR TRANSMITTING SIDELINK CONTROL INFORMATION INDICATING NO SIDELINK DATA

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 581 days.

(21) Appl. No.: 17/924,937

(22) PCT Filed: May 11, 2021

(86) PCT No.: PCT/IB2021/054017
§ 371 (c)(1),
(2) Date: Nov. 11, 2022

(87) PCT Pub. No.: WO2021/229443
PCT Pub. Date: Nov. 18, 2021

(65) Prior Publication Data
US 2023/0198685 A1    Jun. 22, 2023

Related U.S. Application Data

(60) Provisional application No. 63/022,963, filed on May 11, 2020.

(51) Int. Cl.
*H04L 1/1829* (2023.01)
*H04W 72/25* (2023.01)

(52) U.S. Cl.
CPC ........... *H04L 1/1864* (2013.01); *H04W 72/25* (2023.01)

(58) Field of Classification Search
CPC ............................ H04L 1/1864; H04W 72/25
See application file for complete search history.

(56) References Cited

U.S. PATENT DOCUMENTS

2010/0291921 A1\* 11/2010 Ruuska ................. H04W 24/00
455/426.1
2017/0257876 A1    9/2017 Loehr et al.
(Continued)

FOREIGN PATENT DOCUMENTS

CN          109565853 A        4/2019

OTHER PUBLICATIONS

PCT/IB2021/054017, "Notification of Transmittal of the International Search Report and the Written Opinion of the International Searching Authority, or the Declaration" International Searching Authority, Aug. 3, 2021, pp. 1-14.
(Continued)

*Primary Examiner* — Ajay Cattungal
(74) *Attorney, Agent, or Firm* — Kunzler Needham & Hilton (57) ABSTRACT

Apparatuses, methods, and systems are disclosed for transmitting sidelink control information indicating no sidelink data. One method includes determining, at a user equipment, that there is no sidelink data available for a destination. The method includes transmitting sidelink control information to the destination that indicates that there is no sidelink data available for the destination and triggers a feedback response from the destination. The method includes receiving the feedback response from the destination.

20 Claims, 7 Drawing Sheets

(56) References Cited

U.S. PATENT DOCUMENTS

| | | | | |
|---|---|---|---|---|
| 2018/0103460 | A1* | 4/2018 | Sharma | H04W 76/27 |
| 2020/0314915 | A1* | 10/2020 | Lin | H04W 74/0833 |
| 2020/0314953 | A1* | 10/2020 | Lin | H04W 72/56 |
| 2021/0212025 | A1* | 7/2021 | Selvanesan | H04W 76/14 |
| 2021/0250302 | A1* | 8/2021 | Loehr | H04W 76/23 |
| 2021/0298034 | A1* | 9/2021 | He | H04W 72/56 |
| 2021/0298043 | A1* | 9/2021 | He | H04W 28/0278 |

OTHER PUBLICATIONS

Hisense, "Views on Resource Allocation of NR V2X", 3GPP TSG RAN WG1 Meeting #94bis, R1-1810179, Oct. 3-12, 2018, pp. 1-6.

Oppo, "Discussion of RLM for Unicast", 3GPP TSG RAN WG1 #98bis, R1-1910376, Oct. 14-20, 2016, pp. 1-3.

Huawei (Rapporteur), "Report on [90#26][LTE/ProSe] Rel-13 SL BSR trigger and cancellation", 3GPP TSG-RAN WG2 Meeting #91, R2-153231, Aug. 24-28, 2015, pp. 1-11.

3GPP, "3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.0.0, Mar. 2020, pp. 1-141.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

* cited by examiner

METHODS AND APPARATUS FOR TRANSMITTING SIDELINK CONTROL INFORMATION INDICATING NO SIDELINK DATA

CROSS-REFERENCE TO RELATED APPLICATIONS

This application claims priority to U.S. Patent Application Ser. No. 63/022,963 entitled "APPARATUSES, METHODS, AND SYSTEMS FOR A RECEIVING SIDE BEHAVIOR FOR AN RLF MECHANISM" and filed on May 11, 2020 for Joachim Loehr, which is incorporated herein by reference in its entirety.

FIELD

The subject matter disclosed herein relates generally to wireless communications and more particularly relates to transmitting sidelink control information indicating no sidelink data.

BACKGROUND

In certain wireless communications networks, sidelink control information may be transmitted. Generally, sidelink control information is transmitted with data.

BRIEF SUMMARY

Methods for transmitting sidelink control information indicating no sidelink data are disclosed. Apparatuses and systems also perform the functions of the methods. One embodiment of a method includes determining, at a user equipment, that there is no sidelink data available for a destination. In some embodiments, the method includes transmitting sidelink control information to the destination that indicates that there is no sidelink data available for the destination and triggers a feedback response from the destination. In certain embodiments, the method includes receiving the feedback response from the destination.

One apparatus for transmitting sidelink control information indicating no sidelink data includes a processor that determines that there is no sidelink data available for a destination. In various embodiments, the apparatus includes a transmitter that transmits sidelink control information to the destination that indicates that there is no sidelink data available for the destination and triggers a feedback response from the destination. In some embodiments, the apparatus includes a receiver that receives the feedback response from the destination.

Another embodiment of a method for transmitting sidelink control information indicating no sidelink data includes receiving, at a user equipment, sidelink control information that indicates that there is no sidelink data available for the user equipment and triggers a feedback response from the user equipment. In some embodiments, the method includes transmitting the feedback response from the user equipment.

Another apparatus for transmitting sidelink control information indicating no sidelink data includes a receiver that receives sidelink control information that indicates that there is no sidelink data available for the user equipment and triggers a feedback response from the user equipment. In various embodiments, the apparatus includes a transmitter that transmits the feedback response from the user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
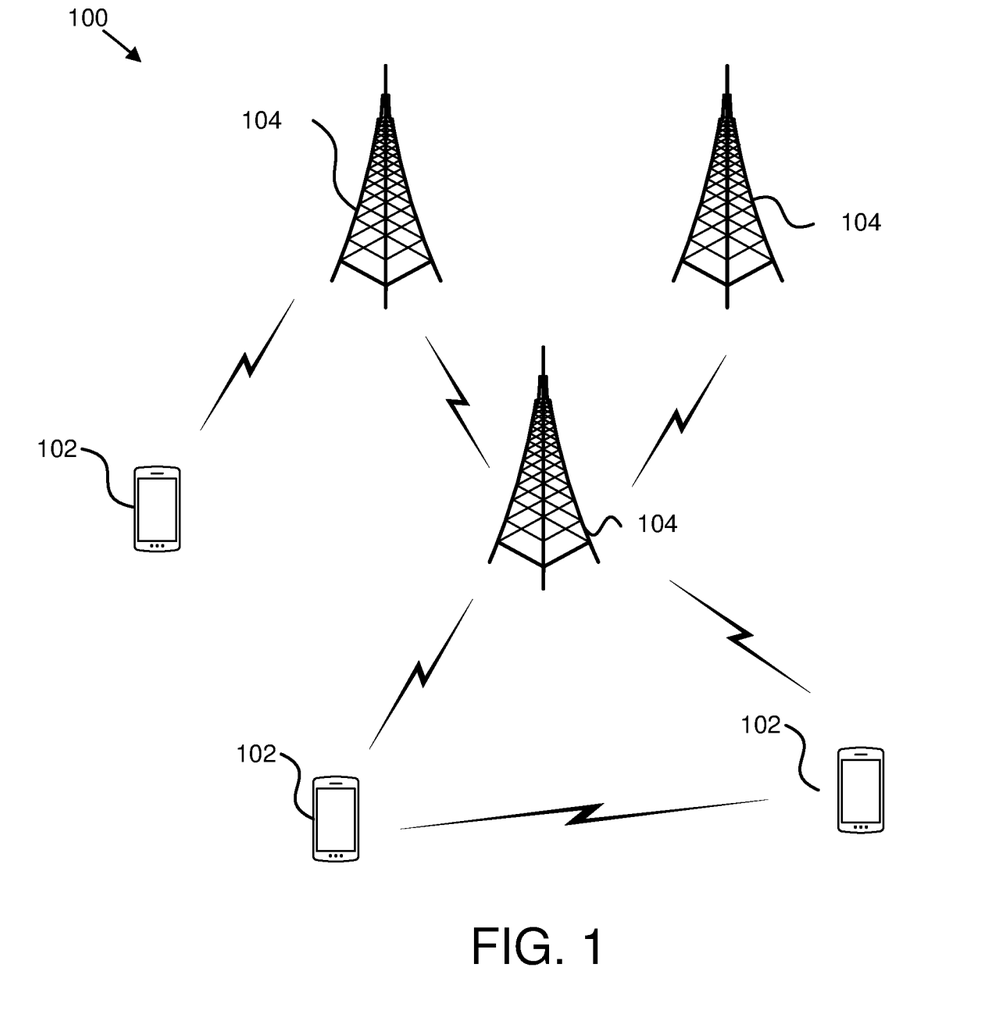
FIG. 1 is a schematic block diagram illustrating one embodiment of a wireless communication system for transmitting sidelink control information indicating no sidelink data.

FIG. 1 depicts an embodiment of a wireless communication system 100 for transmitting sidelink control information indicating no sidelink data. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth R, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine that there is no sidelink data available for a destination. In some embodiments, the remote unit 102 may transmit sidelink control information to the destination that indicates that there is no sidelink data available for the destination and triggers a feedback response from the destination. In various embodiments, the remote unit 102 may receive the feedback response from the destination. Accordingly, the remote unit 102 may be used for transmitting sidelink control information indicating no sidelink data.

In certain embodiments, a remote unit 102 may receive sidelink control information that indicates that there is no sidelink data available for the remote unit 102 and triggers a feedback response from the remote unit 102. In some embodiments, the remote unit 102 may transmit the feedback response from the remote unit 102. Accordingly, the remote unit 102 may be used for transmitting sidelink control information indicating no sidelink data.

Figure 2:
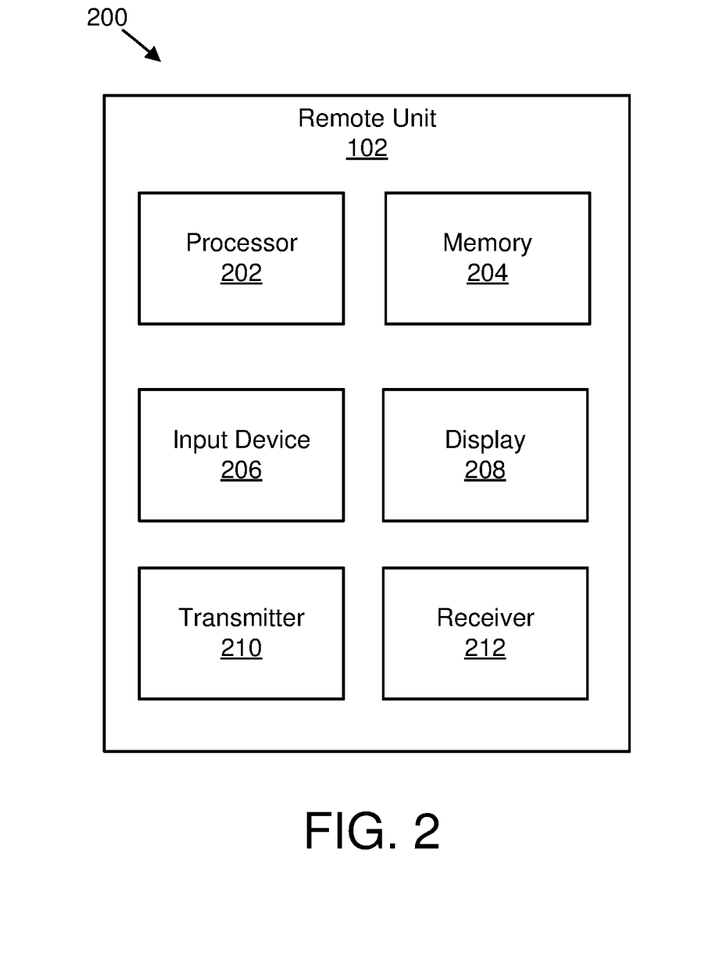
FIG. 2 is a schematic block diagram illustrating one embodiment of an apparatus that may be used for transmitting sidelink control information indicating no sidelink data.

FIG. 2 depicts one embodiment of an apparatus 200 that may be used for transmitting sidelink control information indicating no sidelink data. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processer 202 may determine that there is no sidelink data available for a destination. In various embodiments, the transmitter 210 may transmit sidelink control information to the destination that indicates that there is no sidelink data available for the destination and triggers a feedback response from the destination. In some embodiments, the receiver 212 may receive the feedback response from the destination.

In some embodiments, the receiver 212 may receive, at a user equipment, sidelink control information that indicates that there is no sidelink data available for the user equipment and triggers a feedback response from the user equipment. In various embodiments, the transmitter 210 may transmit the feedback response from the user equipment.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
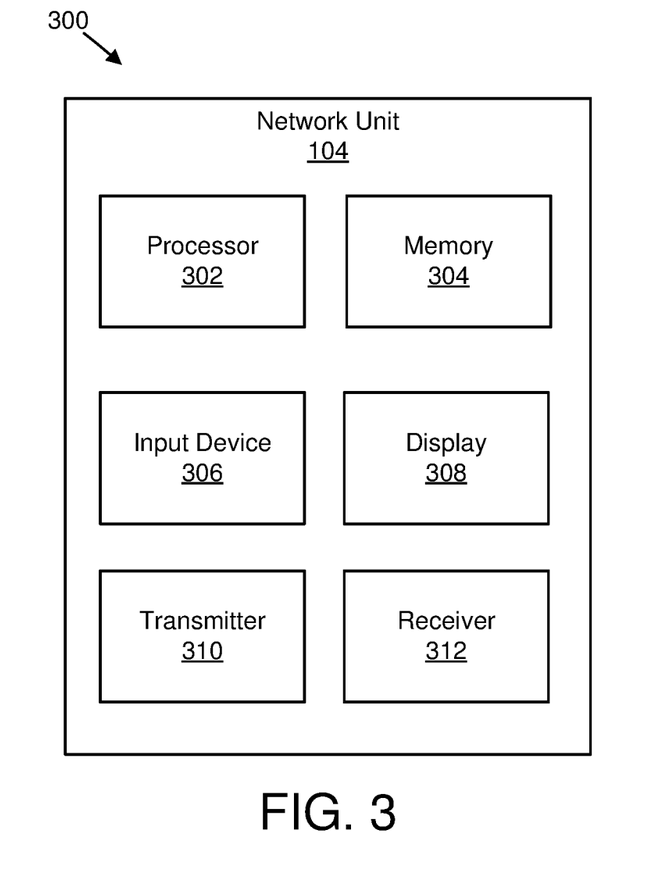
FIG. 3 is a schematic block diagram illustrating one embodiment of an apparatus that may be used for transmitting sidelink control information indicating no sidelink data.

FIG. 3 depicts one embodiment of an apparatus 300 that may be used for transmitting sidelink control information indicating no sidelink data. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may be used for transmitting information described herein and/or the receiver 312 may be used for receiving information described herein and/or the processer 302 may be used for processing information described herein.

In some embodiments, such as using a user equipment ("UE") to network ("Uu") interface (e.g., NR, LTE), radio link monitoring ("RLM") may be performed. If a RLM procedure indicates that the UE is out of sync with respect to DL (e.g., a hypothetical block error rate ("BLER") target for a physical downlink control channel ("PDCCH") exceeds a threshold such as 10%) for a time duration, the UE may declare a radio link failure ("RLF") and may initiate a recovery procedure. The recovery on Uu may include trying to re-establish a radio resource control ("RRC") connection on a different cell. In direct communication between UEs ("PC5"), it may be meaningful to perform radio link monitoring to determine if a radio link between two UEs is sufficiently good and, if not, the UEs may not unnecessarily attempt transmission to the other UE. In certain embodiments, after having declared RLF, UEs may immediately or later clear a context for another UE and free memory space.

In various embodiments, a RLF mechanism at a transmit ("TX") UE may be based on hybrid automatic repeat request ("HARQ") feedback. In certain embodiments, a TX UE counts a number of consecutive discontinuous transmissions ("DTX") received from a receive ("RX") UE in response to a physical sidelink shared channel ("PSSCH") transmission. In some embodiments, RLF may be declared and subsequent actions may be carried out if a counter exceeds a predefined threshold (e.g., x number of consecutive DTX received from the RX UE for a specific link and/or connection).

In certain embodiments, to be able to efficiently run a HARQ-based RLF mechanism at a TX side, the TX UE may generate and/or transmit TBs with random and/or padding data if there is no SL data available for transmission. In such embodiments, the RX UE may not be required to spend processing power for decoding data that is not useful (e.g., random data, padding).

In a first embodiment, there may be logical channel prioritization ("LCP"). In the first embodiment, a sidelink LCP procedure is applied whenever a new transmission is performed. Radio resource control ("RRC") controls scheduling of sidelink data by signaling for each logical channel: 1) sl-Priority where an increasing priority value indicates a lower priority level: 2) sl-PrioritisedBitRate which sets the sidelink prioritized bit rate ("sPBR"); and 3) sl-BucketSize-Duration which sets the sidelink bucket size duration ("sBSD"). RRC additionally controls the LCP procedure by configuring mapping restrictions for each logical channel: sl-configuredSLGrantType1Allowed which sets whether a configured grant Type 1 can be used for sidelink transmission.

In the first embodiment, the following user equipment ("UE") variable is used for the LCP procedure: SBj which is maintained for each logical channel j. The MAC entity shall initialize SBj of the logical channel to zero when the logical channel is established. For each logical channel j, the MAC entity shall: 1) increment SBj by the product sPBR×T before every instance of the LCP procedure, where T is the time elapsed since SBj was last incremented: 2) if the value of SBj is greater than the sidelink bucket size (i.e. sPBR× sBSD): set SBj to the sidelink bucket size. The exact moments that the UE updates SBj between LCP procedures is up to UE implementation, as long as SBj is up to date at the time when a grant is processed by LCP.

Moreover, in the first embodiment, selection of logical channels may be performed. The medium access control ("MAC") entity shall for each sidelink control information ("SCI") corresponding to a new transmission: 1) select a destination associated to one of unicast, groupcast and broadcast, having the logical channel with the highest priority or the MAC control element ("CE"), among the logical channels that satisfy all the following conditions and MAC CE(s), if any, for the sidelink ("SL") grant associated to the SCI: a) SL data is available for transmission; b) SBj>0, in case there is any logical channel having SBj>0; and c) sl-configuredSLGrantType1Allowed, if configured, is set to true in case the SL grant is a Configured Grant Type 1—if multiple destinations have the logical channels satisfying all conditions above with the same highest priority or if multiple destinations have the MAC CE, which destination is selected among them is up to UE implementation; and 2) select the logical channels satisfying all the following conditions among the logical channels belonging to the selected destination: a) SL data is available for transmission; and b) sl-configuredSLGrantType1Allowed, if configured, is set to true in case the SL grant is a Configured Grant Type 1.

Further, in the first embodiments, there may be allocation of sidelink resources. The MAC entity shall for each SCI corresponding to a new transmission: 1) allocate resources to the logical channels as follows: a) logical channels selected for the SL grant with SBj>0 are allocated resources in a decreasing priority order-if the sidelink prioritized bit rate ("SL-PBR") of a logical channel is set to infinity, the MAC entity shall allocate resources for all the data that is available for transmission on the logical channel before meeting the sPBR of the lower priority logical channels: b) decrement SBj by the total size of MAC SDUs served to logical channel j above; and c) if any resources remain, all the logical channels selected are served in a strict decreasing priority order (regardless of the value of SBj) until either the data for that logical channel or the SL grant is exhausted, whichever comes first. Logical channels configured with equal priority should be served equally—the value of SBj can be negative.

In the first embodiments, the UE shall also follow the rules below during the SL scheduling procedures above: 1) the UE should not segment a radio link control ("RLC") service data unit ("SDU") (or partially transmitted SDU or retransmitted RLC PDU) if the whole SDU (or partially transmitted SDU or retransmitted RLC protocol data unit ("PDU")) fits into the remaining resources of the associated MAC entity: 2) if the UE segments an RLC SDU from the logical channel, it shall maximize the size of the segment to fill the grant of the associated MAC entity as much as possible: 3) the UE should maximize the transmission of data: 4) if the MAC entity is given a sidelink grant size that is equal to or larger than 12 bytes while having data available and allowed for transmission, the MAC entity shall not transmit only padding; and 5) a logical channel configured with sl-HARQ-FeedbackEnabled set to enabled and a logical channel configured with sl-HARQ-FeedbackEnabled set to disabled cannot be multiplexed into the same MAC PDU.

Moreover, in the first embodiment, the MAC entity shall not generate a MAC PDU for the HARQ entity if the following conditions are satisfied: 1) there is no sidelink channel state information ("CSI") reporting MAC CE generated for this physical sidelink shared channel ("PSSCH") transmission; and 2) the MAC PDU includes zero MAC SDUs. Logical channels shall be prioritized in accordance with the following order (highest priority listed first): data from sidelink control channel ("SCCH"): sidelink CSI reporting MAC CE; and data from any sidelink traffic channel ("STCH").

Figure 4:
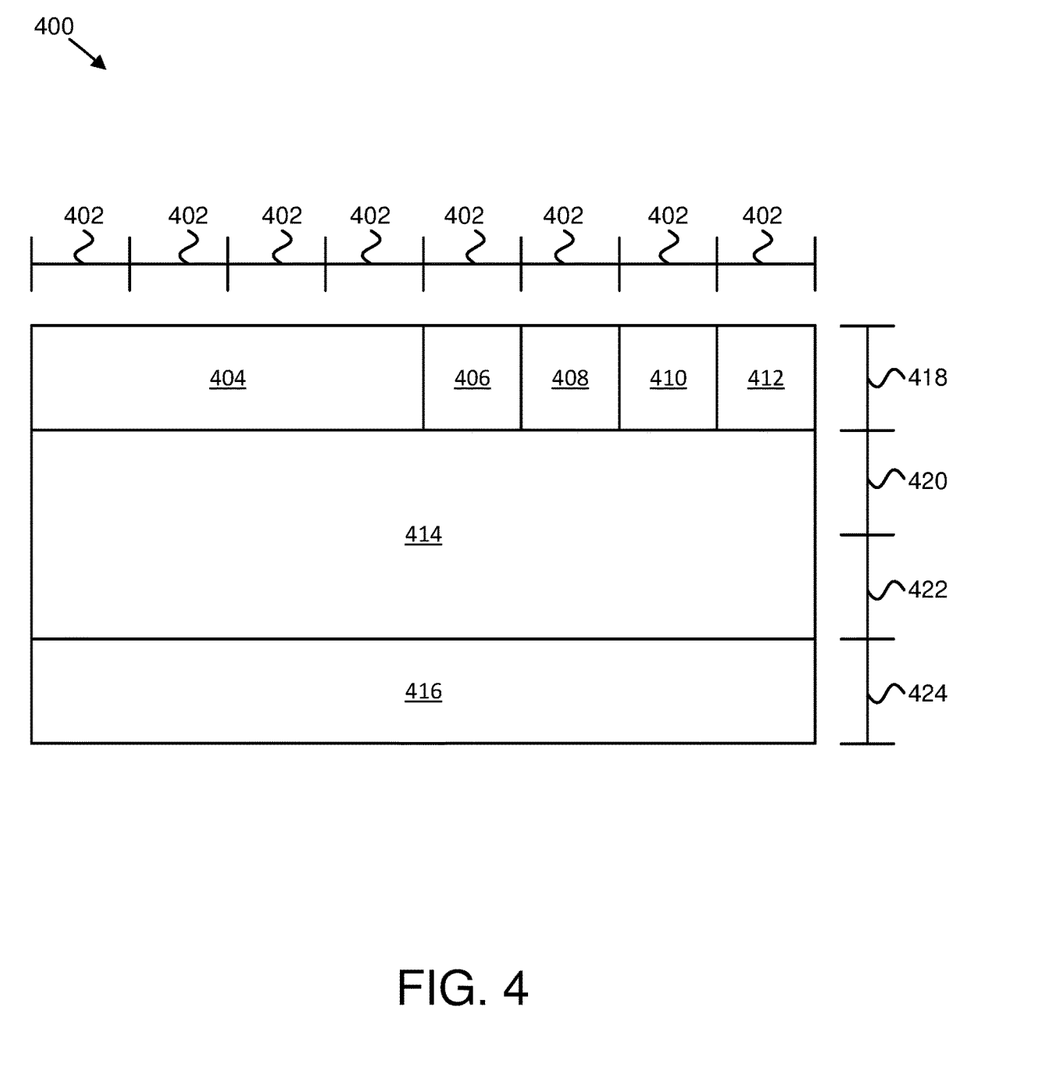
FIG. 4 is a timing diagram illustrating one embodiment of a SL-SCH MAC subheader.

In a second embodiment, a MAC PDU sidelink shared channel ("SL-SCH") may be used. In the second embodiment, a MAC PDU includes one SL-SCH subheader and one or more MAC subPDUs. Each MAC subPDU includes one of the following: a MAC subheader only (including padding): a MAC subheader and a MAC SDU: a MAC subheader and a MAC CE; and/or a MAC subheader and padding. The MAC SDUs are of variable sizes. Each MAC subheader except SL-SCH subheaders correspond to either a MAC SDU, a MAC CE, or padding. The SL-SCH subheader is a fixed size and includes the seven header fields [V/R/R/R/R/SRC/DST]. Specifically, FIG. 4 is a timing diagram illustrating one embodiment of a SL-SCH MAC subheader 400. The SL-SCH MAC subheader 400 is divided into symbols 402 including a header field version ("V") 404, reserved ("R") 406, R 408, R 410, R 412, source ("SRC") 414, and destination ("DST") 416. The header fields are arranged into a first octet 418, a second octet 420, a third octet 422, and a fourth octet 424.

In certain embodiments, a MAC subheader except for padding includes four header fields R/format ("F")/logical channel identifier ("LCID")/length ("L") (e.g., with 8-bit L field, with 16-bit L field). A MAC subheader for MAC CE and padding may include two header fields R/LCID.

Figure 5:
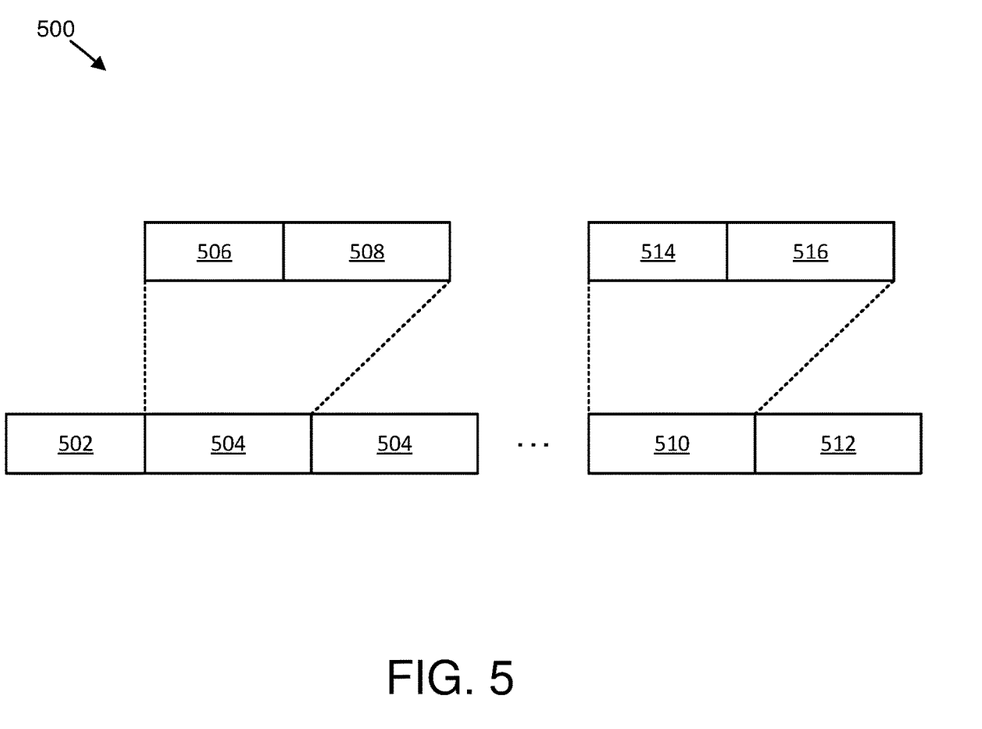
FIG. 5 is a diagram illustrating one embodiment of a SL MAC PDU.

In various embodiments, SL MAC subPDUs with MAC SDUs may be placed after a SL-SCH subheader and before a MAC subPDU with a MAC CE and the MAC subPDU with padding in the MAC PDU as depicted in FIG. 5. The SL MAC subPDU with a MAC CE is placed after all the MAC subPDUs with MAC SDU and before the MAC subPDU with padding in the MAC PDU also as depicted in FIG. 5. The size of padding can be zero.

Specifically, FIG. 5 is a diagram illustrating one embodiment of a SL MAC PDU 500. The SL MAC PDU 500 includes a SL-SCH subheader 502, and a number of MAC subPDUs including MAC SDU 504. Each MAC subPDU including MAC SDU 504 may include a R/F/LCID/L subheader 506, and a MAC SDU 508. Moreover, the SL MAC PDU 500 includes a final MAC subPDU including MAC CE 510 and optional MAC subPDU including padding 512. Moreover, the final MAC subPDU including MAC CE 510 includes an R/LCID subheader 514 and a MAC CE 516.

In some embodiments, a maximum of one MAC PDU may be transmitted per transport block ("TB") per MAC entity. As shown in FIG. 5, a SL MAC PDU (e.g., MAC PDU for SL-SCH) may contain higher layer data (e.g., data from SL logical channels ("LCHs"), MAC CEs and optional padding). In certain embodiments, with a logical channel prioritization ("LCP") procedure it may not be possible that a SL MAC PDU containing only padding is generated and transmitted to a receiver ("RX") UE.

In a first embodiment, SCI indicates whether associated a PSSCH contains data that is just used for the purpose of radio link failure ("RLF") and doesn't contain any higher layer data. If there is no SL data available for transmission for a destination, a transmitting ("TX") UE may for a hybrid automatic repeat request ("HARQ") based RLF procedure generate and/or transmit a SL MAC PDU that doesn't contain any useful higher layer data to trigger the transmission of a HARQ feedback from the receiving UE. The RX UE, upon receiving SCI indicating that the corresponding PSSCH doesn't contain any higher layer data but only padding or random bits, doesn't decode the corresponding PSSCH and/or SL-SCH but just sends a HARQ feedback signal on the PSFCH (e.g., acknowledgement or positive acknowledgment ("ACK") or negative acknowledgement ("NACK")). In some embodiments of the first embodiment, the RX UE signals HARQ ACK upon reception of SCI indicating the successful reception of the SCI. By having this additional information in the SCI, processing power for decoding PSSCH and the related HARQ operation (e.g., soft combining) may be saved at the RX UE side. In certain embodiments of the first embodiment, the RX UE tries to decode PSSCH and signals back real HARQ feedback based on the decoding result. In various embodiments of the first embodiment, the indication (e.g., whether associated PSSCH contains no higher layer data or no useful data that needs to be decoded) is made by a one-bit flag. In various embodiments of the first embodiment, the new indication is signaled within first stage SCI. The one-bit indication may be signaled by one a reserved bit in the first stage SCI.

The first stage SCI may contain an SCI format 0-1. Moreover, the SCI format 0-1 may be used for scheduling PSSCH and $2^{nd}$-stage-SCI on PSSCH. The following information may be transmitted using the SCI format 0-1:1) priority-3 bits: 2) frequency resource assignment—

$$\left\lceil \log_2\left(\frac{N^{SL}_{subChannel}(N^{SL}_{subChannel}+1)}{2}\right)\right\rceil$$

bits if the value of the higher layer parameter sl-MaxNumPerReserve is configured to 2; otherwise $$\left\lceil \log_2\left(\frac{N^{Sl}_{subChannel}(N^{SL}_{subChannel}+1)(2N^{SL}_{subChannel}+1)}{6}\right)\right\rceil$$

bits if the value of the higher layer parameter sl-MaxNumPerReserve is configured to 3:3) time resource assignment—5 bits if the value of the higher layer parameter sl-MaxNumPerReserve is configured to 2; otherwise 9 bits if the value of the higher layer parameter sl-MaxNumPerReserve is configured to 3:4) resource reservation period—$\lceil\log_2(N_{reservPeriod})\rceil$ bits if higher parameter sl-MultiReserveResource is configured: 0 bits otherwise: 5) demodulation reference signal ("DMRS") pattern—[x] bits if more than one DMRS pattern is configured by higher layer parameter sl-PSSCH-DMRS-TimePattern; 0 bits otherwise: 6) 2nd-stage SCI format—[x] bits: 6) beta_offset indicator—[2] bits as provided by higher layer parameter sl-BetaOffsets2ndSCI: 7) number of DMRS ports—1 bit: 8) modulation and coding scheme—5 bits; and 9) reserved—[2-4] bits as determined by higher layer parameter sl-NumReservedBits with value set to zero.

In certain embodiments, a UE receiving SCI indicating that a corresponding PSSCH transmission doesn't contain any higher layer data and can be discarded sends corresponding HARQ feedback (e.g., ACK) for this PSSCH transmission. In such embodiments, a timing for the HARQ feedback signaling (e.g., PSSCH to PSFCH timing) may be used. Since the UE doesn't need to decode the PSSCH transmission, a smaller processing time may be sufficient to generate and/or send corresponding HARQ feedback using a PSFCH transmission (e.g., last two symbols of the PSSCH).

In some embodiments, SCI only may be transmitted without a corresponding PSSCH transmission. To save SL resources there may be instances in which it is beneficial to send only SCI without any PSSCH transmission. The SCI may be used if there is no SL data available for a destination and Tx UE wants to trigger transmission of the RX UE for the purpose of RLF measurements and/or an RLF procedure (e.g., HARQ-based RLF procedure). To reduce transmission power and to reduce interference, a TX UE may signal only SCI without a physical sidelink shared channel ("PS-SCH") transmission. Upon reception of SCI-only, an RX UE may acknowledge the reception of the SCI by sending a HARQ ACK. In various embodiments, SCI indicates that there is no associated PSSCH transmission (e.g., one of the reserved bits in first stage SCI may be used to indicate the absence of a PSSCH transmission). In certain embodiments, a field of SCI or a combination of fields may be set to predefined values indicate an absence of a PSSCH transmission.

In various embodiments, a TX UE may send SCI without a PSSCH transmission for retransmissions (e.g., initial transmission is done with a PSSCH transmission (e.g., TB may contain only padding bits and/or random data) and potential retransmission are sent without a PSSCH transmission-SCI-only).

In certain embodiments, upon receiving a MAC PDU in a PSSCH transmission that contains data identified by a reserved LCID, a UE discards the received MAC PDU. The transmission of such a MAC PDU may be only used for the purpose of the HARQ-based RLF procedure running at the corresponding TX UE. Since the MAC PDU doesn't contain any useful data for the RX UE, the RX UE may discard the complete MAC PDU. In such embodiments, the MAC PDU may contain data identified by a predefined LCID, indicating that the MAC PDU is only used for RLF measurements at the corresponding TX UE. Upon detecting the predefined LCID in the MAC PDU header, the RX UE discards the complete MAC PDU (e.g., no further processing of the MAC PDU is done). In some embodiments, upon receiving a MAC PDU in a PSSCH transmission that contains only padding, a UE discards the complete MAC PDU.

In various embodiments, a SL-SCH MAC subheader indicates that a MAC PDU contains no useful data for a RX UE and may be discarded. In such embodiments, one of the reserved bits of the SL-SCH MAC subheader is used for the discard indication.

As may be appreciated, any of the embodiments described herein may be configurable for a given destination identifier ("ID"), pair of source layer-2 ID and destination layer-2 ID corresponding to a UE to UE interface ("PC5") radio resource control ("RRC") connection and/or SL LCH. For specific destinations and/or LCHs, a UE may rely on upper layer keep alive messages.

Figure 6:
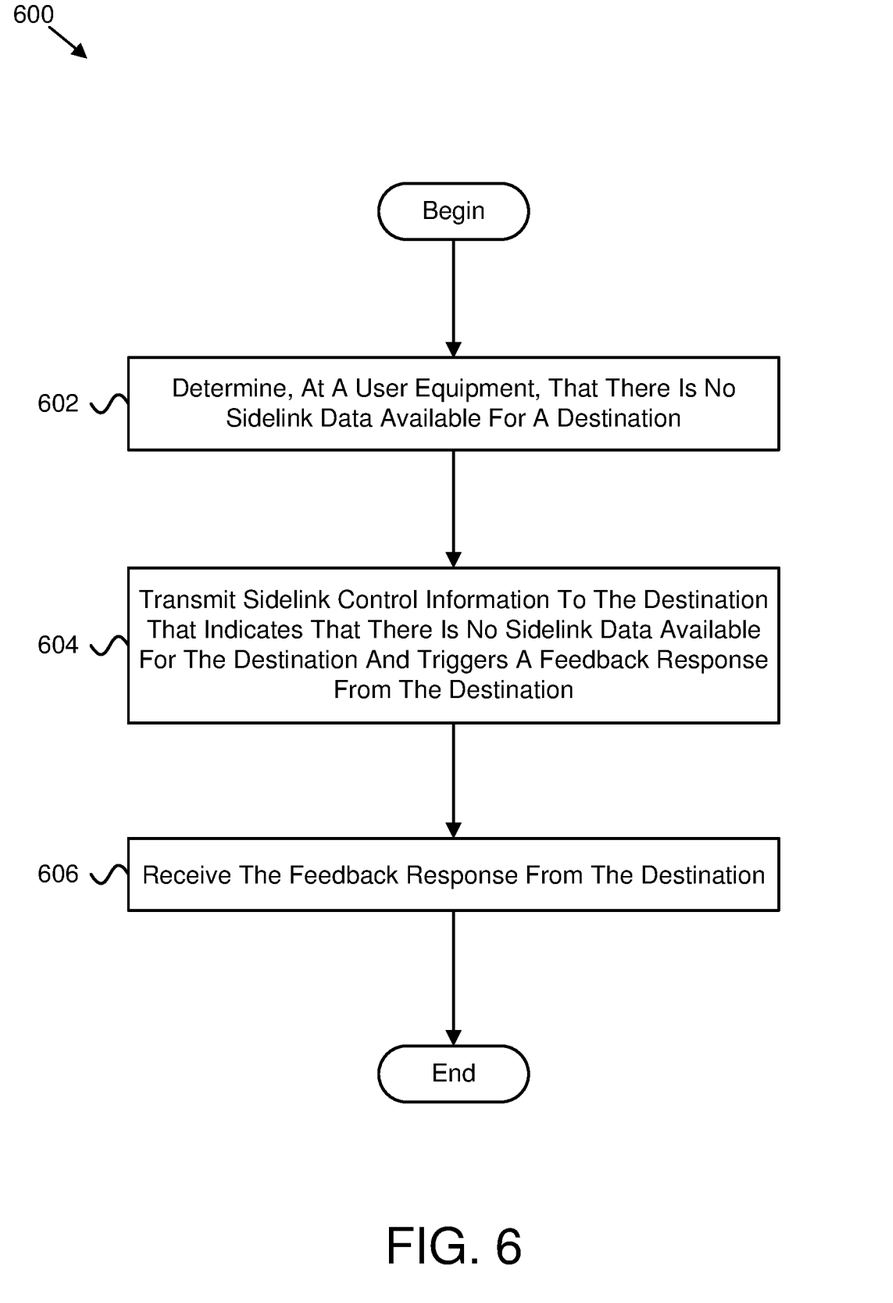
FIG. 6 is a flow chart diagram illustrating one embodiment of a method for transmitting sidelink control information indicating no sidelink data.

FIG. 6 is a flow chart diagram illustrating one embodiment of a method 600 for transmitting sidelink control information indicating no sidelink data. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes determining 602 that there is no sidelink data available for a destination. In some embodiments, the method 600 includes transmitting 604 sidelink control information to the destination that indicates that there is no sidelink data available for the destination and triggers a feedback response from the destination. In certain embodiments, the method 600 includes receiving 606 the feedback response from the destination.

In certain embodiments, a physical sidelink shared channel is associated with the sidelink control information, and the sidelink control information indicates that data carried by the physical sidelink shared channel comprises only padding or only random data. In some embodiments, the data carried by the physical sidelink shared channel comprises a sidelink medium access control protocol data unit that comprises the padding or the random data. In various embodiments, a header of the sidelink medium access control protocol data unit comprises a predetermined logical channel identifier that indicates that data carried by the sidelink medium access control protocol data unit is to be discarded.

In one embodiment, a subheader of a sidelink shared channel medium access control indicates that the sidelink medium access control protocol data unit carries no useful data. In certain embodiments, the method further comprises retransmitting only the sidelink control information without any associated data. In some embodiments, transmitting the sidelink control information comprises transmitting only the sidelink control information without any associated data.

In various embodiments, a reserved bit in the sidelink control information indicates that there is no sidelink data available for the destination and triggers the feedback response from the destination. In one embodiment, a reserved bit in the sidelink control information indicates that there is no physical sidelink shared channel associated with the sidelink control information.

Figure 7:
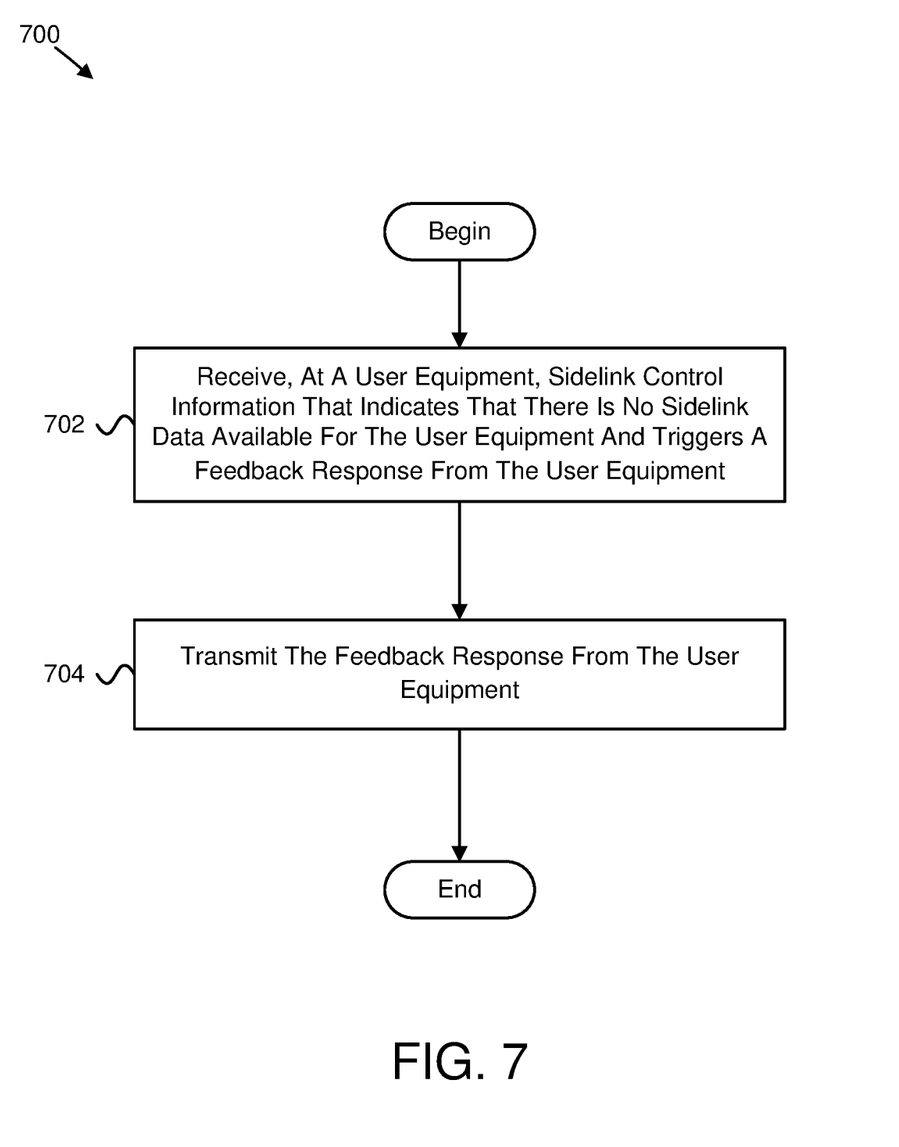
FIG. 7 is a flow chart diagram illustrating another embodiment of a method for transmitting sidelink control information indicating no sidelink data.

FIG. 7 is a flow chart diagram illustrating another embodiment of a method 700 for transmitting sidelink control information indicating no sidelink data. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702 a sidelink buffer status report for an empty buffer includes receiving, at a user equipment, sidelink control information that indicates that there is no sidelink data available for the user equipment and triggers a feedback response from the user equipment. In some embodiments, the method 700 includes transmitting 704 the feedback response from the user equipment.

In certain embodiments, the feedback response is an acknowledgement indicating that the sidelink control information was received by the user equipment. In some embodiments, a physical sidelink shared channel is associated with the sidelink control information, and the sidelink control information indicates that data carried by the physical sidelink shared channel comprises only padding or only random data. In various embodiments, the data carried by the physical sidelink shared channel comprises a sidelink medium access control protocol data unit that comprises the padding or the random data.

In one embodiment, a header of the sidelink medium access control protocol data unit comprises a predetermined logical channel identifier that indicates that data carried by the sidelink medium access control protocol data unit is to be discarded. In certain embodiments, a subheader of a sidelink shared channel medium access control indicates that the sidelink medium access control protocol data unit carries no useful data. In some embodiments, the method further comprises discarding the data carried by the physical sidelink shared channel without decoding the data in response to the sidelink control information indicating that data carried by the physical sidelink shared channel comprises only padding or only random data.

In various embodiments, receiving the sidelink control information comprises receiving only the sidelink control information without any associated data. In one embodiment, a reserved bit in the sidelink control information indicates that there is no sidelink data available for the user equipment and triggers the feedback response from the user equipment. In certain embodiments, a reserved bit in the sidelink control information indicates that there is no physical sidelink shared channel associated with the sidelink control information.

In one embodiment, a method comprises: determining, at a user equipment, that there is no sidelink data available for a destination: transmitting sidelink control information to the destination that indicates that there is no sidelink data available for the destination and triggers a feedback response from the destination; and receiving the feedback response from the destination.

In certain embodiments, a physical sidelink shared channel is associated with the sidelink control information, and the sidelink control information indicates that data carried by the physical sidelink shared channel comprises only padding or only random data.

In some embodiments, the data carried by the physical sidelink shared channel comprises a sidelink medium access control protocol data unit that comprises the padding or the random data.

In various embodiments, a header of the sidelink medium access control protocol data unit comprises a predetermined logical channel identifier that indicates that data carried by the sidelink medium access control protocol data unit is to be discarded.

In one embodiment, a subheader of a sidelink shared channel medium access control indicates that the sidelink medium access control protocol data unit carries no useful data.

In certain embodiments, the method further comprises retransmitting only the sidelink control information without any associated data.

In some embodiments, transmitting the sidelink control information comprises transmitting only the sidelink control information without any associated data.

In various embodiments, a reserved bit in the sidelink control information indicates that there is no sidelink data available for the destination and triggers the feedback response from the destination.

In one embodiment, a reserved bit in the sidelink control information indicates that there is no physical sidelink shared channel associated with the sidelink control information.

In one embodiment, an apparatus comprises a user equipment, the apparatus further comprises: a processor that determines that there is no sidelink data available for a destination; a transmitter that transmits sidelink control information to the destination that indicates that there is no sidelink data available for the destination and triggers a feedback response from the destination; and a receiver that receives the feedback response from the destination.

In certain embodiments, a physical sidelink shared channel is associated with the sidelink control information, and the sidelink control information indicates that data carried by the physical sidelink shared channel comprises only padding or only random data.

In some embodiments, the data carried by the physical sidelink shared channel comprises a sidelink medium access control protocol data unit that comprises the padding or the random data.

In various embodiments, a header of the sidelink medium access control protocol data unit comprises a predetermined logical channel identifier that indicates that data carried by the sidelink medium access control protocol data unit is to be discarded.

In one embodiment, a subheader of a sidelink shared channel medium access control indicates that the sidelink medium access control protocol data unit carries no useful data.

In certain embodiments, the transmitter retransmits only the sidelink control information without any associated data.

In some embodiments, the transmitter transmitting the sidelink control information comprises the transmitter transmitting only the sidelink control information without any associated data.

In various embodiments, a reserved bit in the sidelink control information indicates that there is no sidelink data available for the destination and triggers the feedback response from the destination.

In one embodiment, a reserved bit in the sidelink control information indicates that there is no physical sidelink shared channel associated with the sidelink control information.

In one embodiment, a method comprises: receiving, at a user equipment, sidelink control information that indicates that there is no sidelink data available for the user equipment and triggers a feedback response from the user equipment; and transmitting the feedback response from the user equipment.

In certain embodiments, the feedback response is an acknowledgement indicating that the sidelink control information was received by the user equipment.

In some embodiments, a physical sidelink shared channel is associated with the sidelink control information, and the sidelink control information indicates that data carried by the physical sidelink shared channel comprises only padding or only random data.

In various embodiments, the data carried by the physical sidelink shared channel comprises a sidelink medium access control protocol data unit that comprises the padding or the random data.

In one embodiment, a header of the sidelink medium access control protocol data unit comprises a predetermined logical channel identifier that indicates that data carried by the sidelink medium access control protocol data unit is to be discarded.

In certain embodiments, a subheader of a sidelink shared channel medium access control indicates that the sidelink medium access control protocol data unit carries no useful data.

In some embodiments, the method further comprises discarding the data carried by the physical sidelink shared channel without decoding the data in response to the sidelink control information indicating that data carried by the physical sidelink shared channel comprises only padding or only random data.

In various embodiments, receiving the sidelink control information comprises receiving only the sidelink control information without any associated data.

In one embodiment, a reserved bit in the sidelink control information indicates that there is no sidelink data available for the user equipment and triggers the feedback response from the user equipment.

In certain embodiments, a reserved bit in the sidelink control information indicates that there is no physical sidelink shared channel associated with the sidelink control information.

In one embodiment, an apparatus comprises a user equipment, the apparatus further comprises: a receiver that receives sidelink control information that indicates that there is no sidelink data available for the user equipment and triggers a feedback response from the user equipment; and a transmitter that transmits the feedback response from the user equipment.

In certain embodiments, the feedback response is an acknowledgement indicating that the sidelink control information was received by the user equipment.

In some embodiments, a physical sidelink shared channel is associated with the sidelink control information, and the sidelink control information indicates that data carried by the physical sidelink shared channel comprises only padding or only random data.

In various embodiments, the data carried by the physical sidelink shared channel comprises a sidelink medium access control protocol data unit that comprises the padding or the random data.

In one embodiment, a header of the sidelink medium access control protocol data unit comprises a predetermined logical channel identifier that indicates that data carried by the sidelink medium access control protocol data unit is to be discarded.

In certain embodiments, a subheader of a sidelink shared channel medium access control indicates that the sidelink medium access control protocol data unit carries no useful data.

In some embodiments, the apparatus further comprises a processor that discards the data carried by the physical sidelink shared channel without decoding the data in response to the sidelink control information indicating that data carried by the physical sidelink shared channel comprises only padding or only random data.

In various embodiments, the receiver receiving the sidelink control information comprises the receiver receiving only the sidelink control information without any associated data.

In one embodiment, a reserved bit in the sidelink control information indicates that there is no sidelink data available for the user equipment and triggers the feedback response from the user equipment.

In certain embodiments, a reserved bit in the sidelink control information indicates that there is no physical sidelink shared channel associated with the sidelink control information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   determining that there is no sidelink data available for a destination;
   transmitting sidelink control information (SCI) to the destination without any associated data, wherein the SCI indicates that there is no sidelink data available for the destination and triggers a feedback response from the destination; and
   receiving the feedback response from the destination.

2. The method of claim 1, wherein a physical sidelink shared channel (PSSCH) is associated with the SCI, and the SCI indicates that data carried by the PSSCH comprises only padding or only random data.

3. The method of claim 2, wherein the data carried by the PSSCH comprises a sidelink medium access control (MAC) protocol data unit (PDU) that comprises the padding or the random data.

4. The method of claim 3, wherein a header of the sidelink MAC PDU comprises a predetermined logical channel identifier that indicates that data carried by the sidelink MAC PDU is to be discarded.

5. The method of claim 3, wherein a subheader of a sidelink shared channel MAC indicates that the sidelink MAC PDU carries no useful data.

6. The method of claim 2, further comprising retransmitting only the SCI without any associated data.

7. The method of claim 1, wherein a reserved bit in the SCI indicates that there is no sidelink data available for the destination and triggers the feedback response from the destination.

8. The method of claim 1, wherein a reserved bit in the SCI indicates that there is no physical sidelink shared channel (PSSCH) associated with the SCI.

9. A user equipment (UE), comprising:
   at least one memory; and
   at least one processor coupled with the at least one memory and configured to cause the UE to:
      determine that there is no sidelink data available for a destination;
      transmit sidelink control information (SCI) to the destination without any associated data, wherein the SCI that indicates that there is no sidelink data available for the destination and triggers a feedback response from the destination; and
      receive the feedback response from the destination.

10. A method performed by a user equipment (UE), the method comprising:
    receiving sidelink control information (SCI) without any associated data, wherein the SCI indicates that there is no sidelink data available for the UE and triggers a feedback response from the UE; and
    transmitting the feedback response from the UE.

11. The method of claim 10, wherein the feedback response is an acknowledgement indicating that the SCI was received by the UE.

12. The method of claim 10, wherein a physical sidelink shared channel (PSSCH) is associated with the SCI, and the SCI indicates that data carried by the PSSCH comprises only padding or only random data.

13. The method of claim 12, wherein the data carried by the PSSCH comprises a sidelink medium access control (MAC) protocol data unit (PDU) that comprises the padding or the random data.

14. The method of claim 13, wherein a header of the sidelink MAC PDU comprises a predetermined logical channel identifier that indicates that data carried by the sidelink MAC PDU is to be discarded.

15. The method of claim 13, wherein a subheader of a sidelink shared channel MAC indicates that the sidelink MAC PDU carries no useful data.

16. The method of claim 12, further comprising discarding the data carried by the PSSCH without decoding the data in response to the SCI indicating that data carried by the PSSCH comprises only padding or only random data.

17. The method of claim 10, wherein a reserved bit in the SCI indicates that there is no sidelink data available for the UE and triggers the feedback response from the UE.

18. The method of claim 10, wherein a reserved bit in the SCI indicates that there is no physical sidelink shared channel associated with the SCI.

19. A user equipment (UE), comprising:
    at least one memory; and
    at least one processor coupled with the at least one memory and configured to cause the UE to:
       receive sidelink control information (SCI) without any associated data, wherein the SCI indicates that there is no sidelink data available for the UE and triggers a feedback response from the UE; and
       transmit the feedback response from the UE.

20. The UE of claim 19, wherein the feedback response is an acknowledgement indicating that the SCI was received by the UE.

* * * * *